United States Patent
Shao

(10) Patent No.: US 8,510,587 B2
(45) Date of Patent: Aug. 13, 2013

(54) TIME SYNCHRONIZATION SYSTEM AND SERVER USING A BASEBOARD MANAGEMENT CONTROLLER ACQUIRING TIME SIGNALS TO RECORD OCCURRENCE TIME OF SYSTEM LOGS BEFORE THAN HOST SYSTEM

(75) Inventor: Wei Shao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 406 days.

(21) Appl. No.: 12/875,154

(22) Filed: Sep. 3, 2010

(65) Prior Publication Data
US 2011/0314322 A1    Dec. 22, 2011

(30) Foreign Application Priority Data
Jun. 22, 2010    (CN) .......................... 2010 1 0206009

(51) Int. Cl.
*G06F 1/12*      (2006.01)
*G06F 13/42*      (2006.01)
*G06F 1/00*      (2006.01)

(52) U.S. Cl.
USPC ............................ 713/375; 713/400; 713/500

(58) Field of Classification Search
USPC .................................................. 713/400, 375
See application file for complete search history.

(56) References Cited

U.S. PATENT DOCUMENTS

| | | | |
|---|---|---|---|
| 7,197,657 B1* | 3/2007 | Tobias ........................... | 713/400 |
| 7,437,258 B2* | 10/2008 | Robertson et al. ............ | 702/106 |
| 7,581,133 B2* | 8/2009 | Lambert et al. ............... | 713/601 |
| 7,716,515 B2* | 5/2010 | Shih .............................. | 713/500 |
| 8,259,749 B2* | 9/2012 | Li et al. ........................ | 370/464 |
| 2010/0080249 A1* | 4/2010 | Li et al. ........................ | 370/503 |
| 2011/0185216 A1* | 7/2011 | Zhao et al. .................... | 713/401 |

* cited by examiner

*Primary Examiner* — Suresh Suryawanshi
(74) *Attorney, Agent, or Firm* — Altis Law Group, Inc.

(57) ABSTRACT

A time synchronization system includes a host system, a BIOS module, a BMC module, and a RTC module. The BIOS module is embedded in the host system. The BMC module is connected with the BIOS module and communicates with the BIOS module. The RTC module communicates with the BMC module and provides time signals to the BMC module. The host system acquires the time signals from the BMC module through the BIOS module.

6 Claims, 3 Drawing Sheets

TIME SYNCHRONIZATION SYSTEM AND SERVER USING A BASEBOARD MANAGEMENT CONTROLLER ACQUIRING TIME SIGNALS TO RECORD OCCURRENCE TIME OF SYSTEM LOGS BEFORE THAN HOST SYSTEM

BACKGROUND

1. Technical Field

The present disclosure relates to a time synchronization system and a server using the same.

2. Description of Related Art

Current servers include a baseboard management controller (BMC) complying with intelligent platform management interface (IPMI) specification. The time of the BMC is acquired from a real time chip (RTC) via a basic input output system (BIOS) during a power on self test (POST) under IPMI specification. However, the BMC starts earlier than the BIOS. Therefore, the time of the BMC is set to a default time (1970/01/01 00/00/00) before the BIOS transmits the real time to the BMC. That is, a registering time of many system logs of the BMC will be incorrect.

Therefore, it is desirable to provide a time synchronization system and a server having the same which can overcome the limitations described above.

DETAILED DESCRIPTION

Embodiments of the disclosure will now be described in detail, with reference to the accompanying drawings.

Figure 1:
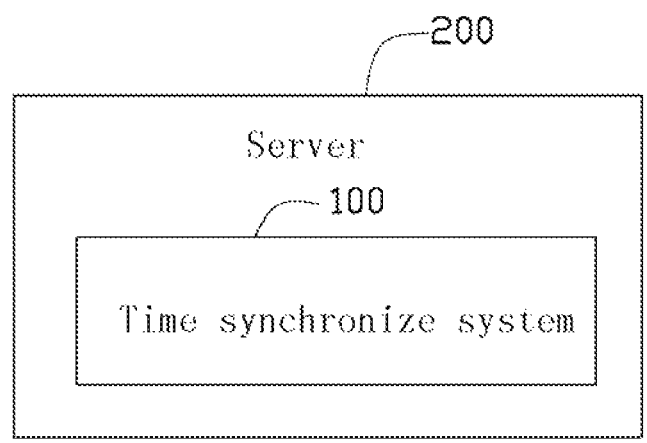
FIG. 1 is a functional block diagram of a server, according to a first exemplary embodiment.
Figure 2:
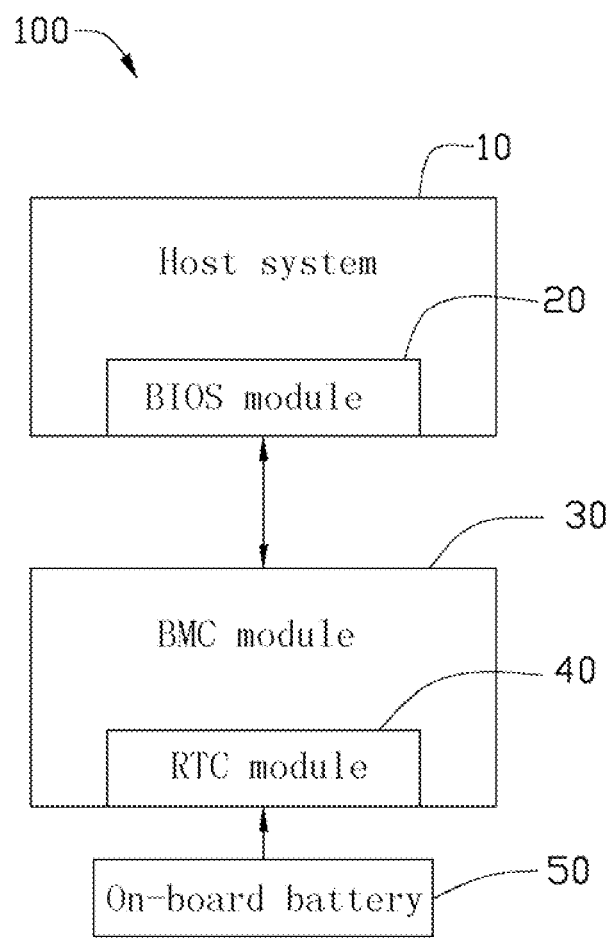
FIG. 2 is a functional block diagram of a time synchronization system of the server of FIG. 1.

Referring to FIGS. 1-2, a time synchronization system 100 in accordance with the first exemplary embodiment is shown. The time synchronization system 100 is embedded in a server 200, and comprises a host system 10, a BIOS module 20, a BMC module 30, a RTC module 40, and an on-board battery 50. The BIOS module 20 is embedded in the host system 10, and communicates with the BMC module 30 connected with the RTC module 40. The on-board battery 50 supplies electrical power to the RTC module 40.

The host system 10 comprises a number of electronic elements, such as a main board, a CPU, a memory and other components not detailed herein as they are well known in the art. The host system 10 is configured to receive external control signals, and perform operations according to the external control signals.

The BIOS module 20 comprises a BIOS chip and a setup program stored in the BIOS chip. The setup program runs in the BIOS chip when the host system 10 is turned on. The BIOS module 20 is configured to read time signals from the BMC module 30, and transmit the time signals to the host system 10.

The BMC module 30 is a processor, for example a 32-bit ARM7, and follows IPMI specification. Different types of sensors built into the host system 10 report to the BMC module 30 on parameters such as temperature, cooling fan speeds, power status, operating system (OS) status, etc. The BMC module 30 stores system logs comprising operating information of hardware and software. When there is any error occurred in the server 200, user or system can analysis the reasons according to the system logs stored in the BMC module 30.

The RTC module 40 is embedded in the BMC module 30, and configured to provide stable and accurate time signals to the BMC module 30. The RTC module 40 is connected to the BMC module 30 by an $I^2C$ bus 41. The time signals are configured to allow accurate time stamping of occurrences and events recorded in the system logs. The RTC module 40 operates at all times, even when the host system 10 is off, and keeps tacking of current time and date.

The on-board battery 50 is embedded in the host system 10, and supplies electrical power to the RTC module 40 at all times. When the host system 10 is turned on, an external battery may be used to charge the RTC module 40.

In operation, when the server is turned on, the BMC module 30 reads real time from the RTC module 40, and converts real time to the time signals. The BIOS module 20 acquires the time signals from the BMC module 30 following IPMI specification and through a system interface connected between the BIOS module 20 and the BMC module 30. Then the BIOS module 20 transmits the time signals to the host system 10. Therefore, the BMC module 30 acquires accurate time and date for use in the system logs that start up earlier than the host system 10.

Figure 3:
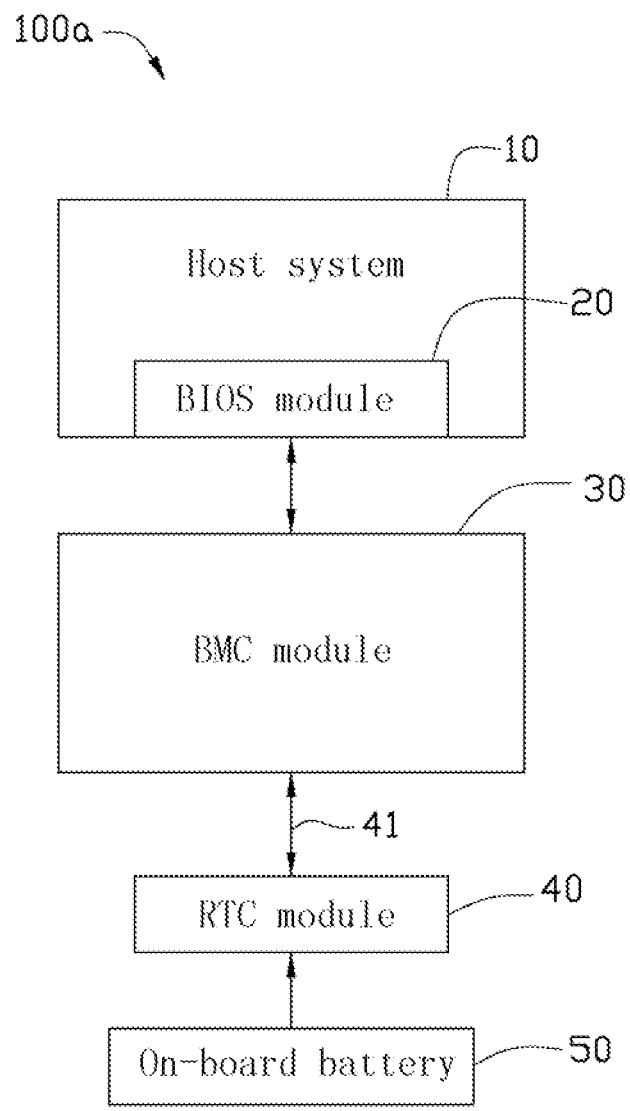
FIG. 3 is a functional block diagram of a time synchronization system of a server, according to a second exemplary embodiment.

Referring to FIG. 3, a time synchronization system 100a according to the second embodiment is shown. The difference between the time synchronization system 100a and the time synchronization system 100 of the first exemplary embodiment is that the RTC module 40 is a self-contained unit and not embedded in the BMC module 30. The BMC module 30 electrically connects with the RTC module 40.

The present disclosure provides the BMC module 30 connected with the RTC module 40 thereby obtaining the ability of acquiring time signals before the host system 10 by itself, as such to record the occurrence time of the system logs accurately.

It will be understood that particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A time synchronization system, comprising:
    a host system;
    a basic input output system (BIOS) module embedded in the host system;
    a baseboard management controller (BMC) module connected with the BIOS module and communicating with the BIOS module; and
    a real time chip (RTC) module connected to the BMC module by an I2C bus and in communication with the BMC module and configured for providing time signals to the BMC module, and the host system acquiring the time signals from the BMC module through the BIOS module; wherein the BMC acquires the time signals to record the occurrence time of system logs before than the host system.

2. The time synchronization system of claim 1, further comprising an on-board battery embedded on the host system, and configured for supplying power to the RTC module at all times.

3. The time synchronization system of claim 1, wherein the BIOS module comprises a BIOS chip and a setup program stored in the BIOS chip.

4. The time synchronization system of claim 3, wherein the BIOS module is configured to read the time signals from the BMC module, and transmit the time signals to the host system.

5. The time synchronization system of claim 1, wherein the BMC module stores system logs comprising operating information of hardware and software.

6. A server, comprising:
  a time synchronization system, comprising:
    a host system;
    a basic input output system (BIOS) module embedded in the host system;
    a baseboard management controller (BMC) module connected with the BIOS module and communicating with the BIOS module; and
    a real time chip (RTC) module connected to the BMC module by an I2C bus and in communication with the BMC module and configured for providing time signals to the BMC module, and the host system acquiring the time signals from the BMC module through the BIOS module; wherein the BMC acquires the time signals to record the occurrence time of system logs before than the host system.

\* \* \* \* \*